US012357521B1

(12) United States Patent
Binder

(10) Patent No.: US 12,357,521 B1
(45) Date of Patent: Jul. 15, 2025

(54) PATIENT TRANSFER SHEET

(71) Applicant: Binder Lift Inc, Bigfork, MT (US)

(72) Inventor: Rick Jerri Binder, Bigfork, MT (US)

(73) Assignee: BINDER LIFT INC, Bigfork, MT (US)

( * ) Notice: Subject to any disclaimer, the term of this patent is extended or adjusted under 35 U.S.C. 154(b) by 0 days.

(21) Appl. No.: 18/982,228

(22) Filed: Dec. 16, 2024

(51) Int. Cl.
*A61G 7/10* (2006.01)
*A61G 7/00* (2006.01)

(52) U.S. Cl.
CPC ......... *A61G 7/1026* (2013.01); *A61G 7/1032* (2013.01); *A61G 7/1063* (2013.01); *A61G 7/1025* (2013.01); *A61G 7/1069* (2013.01)

(58) Field of Classification Search
CPC .. A61G 7/1026; A61G 7/1025; A61G 7/1032; A61G 7/1063; A61G 7/1069
USPC ................ 5/81.1 T, 81.1 HS, 81.1 C, 81.1 R
See application file for complete search history.

(56) References Cited

U.S. PATENT DOCUMENTS

| | | | | | |
|---|---|---|---|---|---|
| 3,769,642 | A * | 11/1973 | Warman | A61G 7/1026 | 5/81.1 T |
| 4,051,565 | A * | 10/1977 | Berge | A61G 7/1032 | 5/81.1 R |
| 4,944,053 | A * | 7/1990 | Smith | A61G 7/1032 | 5/81.1 T |
| 5,005,232 | A | 4/1991 | Wright et al. | | |
| 5,530,974 | A | 7/1996 | Rains et al. | | |
| 6,012,183 | A * | 1/2000 | Brooke | A61G 7/1032 | 5/81.1 HS |
| 6,374,435 | B1 * | 4/2002 | Leininger | A61G 7/1032 | 5/81.1 HS |
| 6,467,106 | B1 * | 10/2002 | Heimbrock | A61G 7/103 | 5/81.1 HS |
| 6,675,411 | B1 | 1/2004 | Javier | | |
| 6,701,544 | B2 * | 3/2004 | Heimbrock | A61G 7/1034 | 5/81.1 R |
| 6,820,292 | B2 * | 11/2004 | Heimbrock | A61G 7/1034 | 5/81.1 R |
| 6,823,542 | B2 * | 11/2004 | Berge | A47C 31/08 | 5/81.1 HS |
| 6,845,529 | B2 * | 1/2005 | Berge | A61G 7/1026 | 5/81.1 HS |
| 7,020,912 | B2 * | 4/2006 | Berge | A61G 7/1032 | 5/490 |
| 7,032,261 | B2 * | 4/2006 | Heimbrock | A61G 7/1026 | 5/81.1 HS |
| 7,146,660 | B2 * | 12/2006 | Heimbrock | A61G 7/103 | 5/81.1 R |

(Continued)

*Primary Examiner* — Robert G Santos

(57) ABSTRACT

Provided herein are bed-to-bed patient transfer sheets that are flexible, easy to assemble, attachable and re-attachable, highly portable, endlessly customizable, and able to meet the needs of the biomedical community due to the modular design features of the bed-to-bed patient transfer sheet. The described patient transfer sheets provide sufficient functionality to meet the modern needs for transporting patients to and from different transportation vehicles, hospital locations such as operating rooms, and examination rooms, or laboratory, treatment, and recovery locations in hospitals or other off-site biomedical or health-care based locations. The transfer sheets are also easily decontaminated of human waste between uses, making them reusable.

23 Claims, 7 Drawing Sheets

(56) References Cited

U.S. PATENT DOCUMENTS

| | | | | |
|---|---|---|---|---|
| 7,370,376 | B2 * | 5/2008 | Chou | A61G 7/1026<br>5/81.1 HS |
| 7,650,654 | B2 | 1/2010 | Lambarth et al. | |
| 8,480,097 | B1 | 7/2013 | Judge et al. | |
| 8,661,578 | B2 | 3/2014 | Judge | |
| 2002/0112286 | A1 | 8/2002 | Upton et al. | |
| 2003/0070226 | A1 | 4/2003 | Heimbrock | |
| 2004/0143902 | A1 * | 7/2004 | Heimbrock | A61G 7/1026<br>5/81.1 R |
| 2004/0163176 | A1 * | 8/2004 | Berge | A47C 31/08<br>5/81.1 R |
| 2004/0172751 | A1 * | 9/2004 | Berge | A61G 7/1026<br>5/81.1 HS |
| 2005/0102749 | A1 * | 5/2005 | Heimbrock | A61G 7/1026<br>5/81.1 R |
| 2005/0102750 | A1 * | 5/2005 | Berge | A61G 7/1026<br>5/81.1 HS |
| 2006/0191070 | A1 * | 8/2006 | Heimbrock | A61G 7/1026<br>5/81.1 R |
| 2007/0151024 | A1 * | 7/2007 | Chou | A61G 7/1032<br>5/81.1 HS |
| 2008/0216231 | A1 * | 9/2008 | Lambarth | A61G 7/1026<br>5/81.1 HS |
| 2011/0061162 | A1 | 3/2011 | Judge | |
| 2013/0074267 | A1 | 3/2013 | Kenalty et al. | |
| 2016/0367422 | A1 | 12/2016 | Weedling | |

* cited by examiner

FIG. 5A
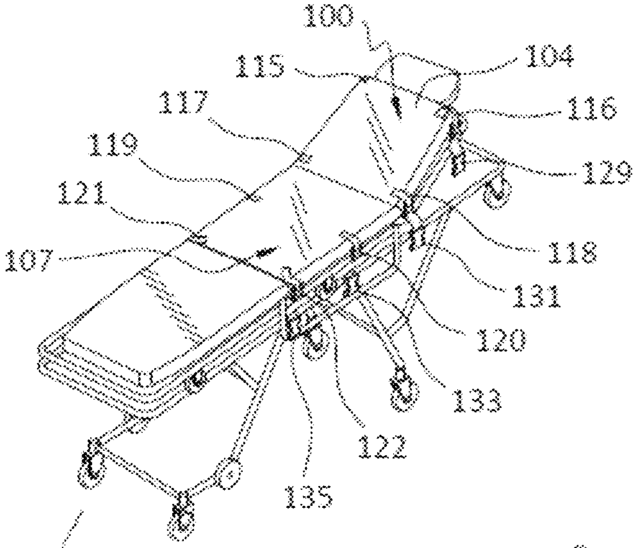
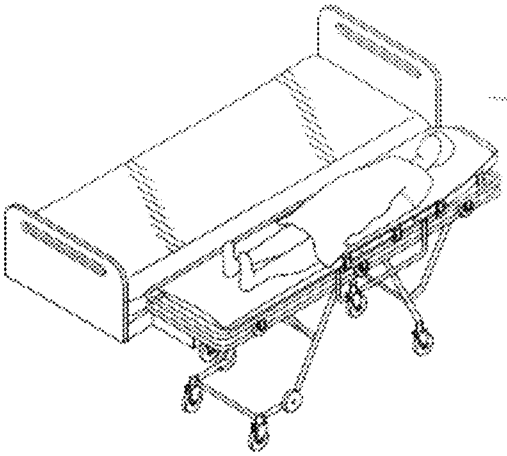
FIG. 5B
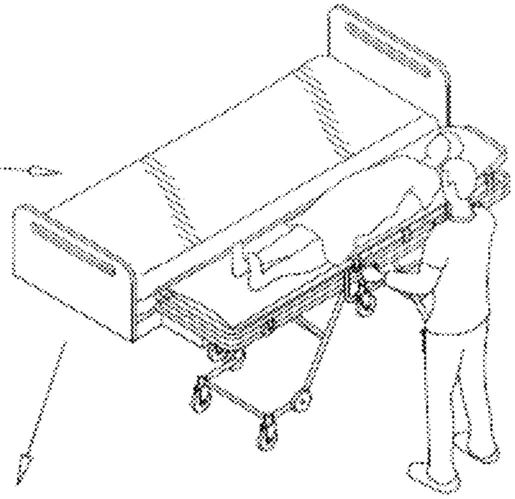
FIG. 5C
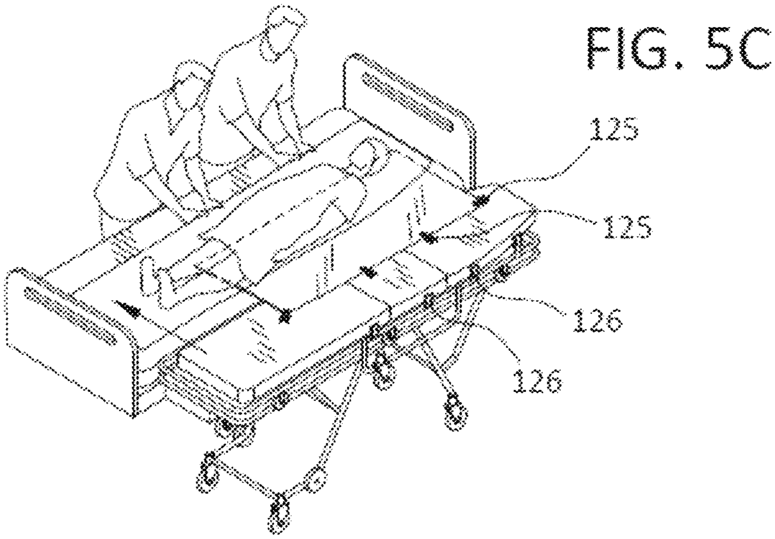
FIG. 5D

PATIENT TRANSFER SHEET

BACKGROUND

This disclosure relates generally to patient transportation or transference of immobile people, patients, injured persons, or others needing assistance that subsequently become patients, to hospital and clinical environments, and other biomedical or patient care settings. The disclosure relates to a patient transfer sheet for transporting or transferring a patient from one surface to another, for example between an ambulance gurney to a hospital gurney, between beds or gurneys in an operating room, or between beds or gurneys in an examination, laboratory, treatment, or recovery location.

Provided herein are devices used in the biomedical field for transporting or transferring disabled people, patients, injured persons or others needing assistance, between supporting surfaces, e.g., a hospital or ambulance gurney to a bed, hospital bed or hospital gurney, beds or gurneys in an operating room, or in an examination, laboratory, treatment, or recovery location. More particularly, disclosed are reuseable patient transfer sheets for this purpose, methods of using said transfer sheets in the transfer of patients from one bed or surface to another, and methods of manufacturing the same.

Musculoskeletal injuries consistently account for about half of all injuries to prehospital care providers engaged in emergency medical service (EMS) operations. The back is the primary body part affected, resulting in a 7.3 times higher back injury rate than the national average (Maguire et al., *Prehospital and Disaster Medicine,* 38 (5), 581-588; 2023). As the prevalence of obesity in the general population increases, the risk of injury to EMS workers who handle and transport patients grows (Flegal et al., *AMA,* 288 (14), 1723-1727; 2002). Many EMS runs begin with and nearly all EMS runs end with a lateral transfer task, often from a bed to a stretcher at the patient's home or care facility and from the stretcher to the gurney at the hospital. (See, Conrad et al., *AAOHN Journal,* 48 (9), 423-429; 2009). Research studying lateral transfer methods indicates that these movements are physically demanding tasks that result in large biomechanical loads while in awkward postures. (Lavender et al., *Applied ergonomics,* 31 (1), 45-57; 2000).

This is true not only for prehospital care providers engaged in EMS operations but also for all other healthcare professions tasked with laterally transferring a patient from one surface to another. (Vinstrup et al., *BMC Musculoskeletal Disorders,* 21 (1), 715; 2020).

There are many powered and non-powered lateral transfer aids on the market proven to reduce the biomechanical loads sustained by care providers when performing lateral patient transfers. However, in the US only 33% of care providers with equipment available frequently used the lateral transfer aids. (See, Lee et al., *International Journal of Nursing Studies,* 74, 53-60; 2017). This finding is further supported by recent surveillance from US National Institute for Occupational Safety and Health which indicates that no equipment/aid was used in 82% of reported patient handling injuries. (See, Gomaa et al., *MMWR Morbidity and Mortality Weekly Report,* 64 (15), 405-410; 2015). The most commonly-reported barriers for appropriate use of these assistive devices include time-restraints and equipment availability. (See, Kucera et al., *International Journal of Nursing Studies,* 91, 35-46; 2019).

Such simple devices exist, such as patient movement aids, transfer tubes, and transfer apparatuses as described, for instance, in U.S. Patent Publication Nos. 2002/0112286, 2011/0061162, and 2016/0367422, respectively, as well as an evacuation mattress described in U.S. Patent Publication No. 2013/0074267. Other devices such as a patient repositioning and position maintenance device is described in U.S. Pat. No. 5,530,974, as well as a method moving a patient laterally using transfer tubes is described in U.S. Pat. No. 6,675,411. Additionally, there are also commercially available flexible stretchers with handles affixed to the stretcher.

Despite a myriad of a variety of designs and implementations, none of the patient transfer sheet designs available today are able to specifically fit all of the needs of the modern medical EMS ambulatory fleets, hospitals or healthcare facilities. Biomedical and laboratory personnel require time-saving, effort-reducing devices with customizable designs, which are adaptable to various environments, stable in diverse types of working conditions, easy to employ, that are lightweight, flexible and enhance the efficiency of their workflows. These professionals seek patient transfer sheets that are lightweight, quick to use, and able to accommodate different bed or gurney designs, while eliminating cumbersome steps like rolling the patient to place the transfer aid underneath. Therefore, there remains a clear need for a more customizable, portable, lightweight patient transfer sheet that is fast to set up, easy to deploy, and specifically designed to meet the modern demands of these fields.

Provided herein are described biomedical transfer sheets that are flexible, easy to assemble, attach and re-attach, highly portable, endlessly customizable, and able to meet the needs of the biomedical community due to the modular design features of the patient transfer sheet described herein. No other commercially available or previously described transfer sheets are able to meet so many different requirements of today's biomedical practitioners like the patient transfer sheet described herein. And yet, this transfer sheet is simple, flexible, composed of core components including a tubular plastic sheet, straps that are sewn into or otherwise permanently affixed to the tubular plastic sheet, and attachment means permanently attached to each of the straps.

The above core components provide sufficient functionality to meet the modern needs for transporting patients to and from different transportation vehicles, hospital locations such as operating rooms, and examination rooms, or laboratory, treatment, and recovery locations in hospitals or other off-site biomedical or health-care based locations.

SUMMARY

Provided is an easy to assemble, flexible, attachable and re-attachable, highly portable, customizable bed-to-bed patient transfer sheet. The bed-to-bed patient transfer sheet, comprises: a) a tubular plastic sheet, comprising a short dimension and a long dimension perpendicular to each other lying in a single plane and describing a rectangular shape of the tubular plastic sheet, wherein the tubular plastic sheet is planar, and in a linear direction, has a head section, an upper and lower middle section, and a foot section, an outside surface of the tubular plastic sheet and an inside surface of the tubular plastic sheet, the outside surface located on an opposite side of the inside surface and together form a tube shape, a top open end and a bottom open end formed at opposite ends of the tubular plastic sheet, each having a diameter in the short dimension of the tubular plastic sheet and located perpendicular to the outside surface and inside surface, and a first edge and a second edge formed opposite each other in the long dimension, where the first edge and second edge are parallel to each other and each perpendicular to the short dimension, b) 6 to 8 first localized buckle attachment straps are positioned in the head section, upper and lower middle sections, and foot section, each attached to the sheet and comprising a sewn end and an attachment end, where the first localized buckle attachment straps comprise a first localized buckle head-left and head-right attachment straps, an upper middle left and right attachment straps, a lower middle left and right attachment straps, and a foot-left and foot-right attachment straps, the sewn end and the attachment end of each of the first localized buckle attachment head attachments straps, upper and lower middle attachments straps, and foot attachment straps are located opposite each other, each of the first localized head attachment straps, upper and lower middle attachment straps, and foot attachment straps is rectangular in shape and comprises a long dimension and a short dimension, and where the localized first buckle head-left and head right first attachment straps, and localized first buckle foot-left and foot-right attachment straps are diagonally affixed on each of the first edge and the second edges, and the localized first buckle upper middle left and right attachment straps, and localized first buckle lower middle left and right attachment straps are horizontally affixed on each of the first edge and the second edge, and c) an attachment means comprising a quick-release fastener, clasp, buckle, zipper, or clip permanently attached to each of the attachment ends of the first attachment straps, wherein the tubular plastic sheet possesses dimensions of about 3 feet to about 6 feet in the long dimension and about 2 feet to about 4 feet in the short dimension and approximates a surface area of a bed, with the top end positioned at a head of the bed, and the bottom end positioned at a foot of the bed.

In another embodiment, the bed-to-bed patient transfer sheet further comprises a number of localized second buckle attachment straps comprising a second localized buckle head-left and head-right attachment straps, second upper middle left and right attachment straps, second lower middle left and right attachment straps, and a second foot-left and foot-right attachment straps, where the localized head-left and head-right second attachment straps, and localized foot-left and foot-right second attachment straps are diagonally attached second attachment straps that are equal in number to the localized first attachment buckle straps, where the localized upper middle left and right second attachment straps, and localized lower middle left and right second attachment straps are horizontally attached localized second attachment straps that are equal in number to the localized first attachment buckle straps, where each of the localized second attachment straps comprise a strap end and a cognate end, where each of the strap ends and each of the cognate ends are positioned opposite of each other on each localized second attachment straps, and where each of the cognate ends comprise affixed thereto a directionally matched attached counterpart localized attachment means that interacts with each of the localized first attachment means to affix each of the localized first attachment straps individually to an individual one of each of the localized second attachment straps via interlocking attachment means and cognate ends.

In another embodiment of the described bed-to-bed patient transfer sheet the localized second attachment straps are fixedly attached to one or more components of the bed and are located in positions on the bed such that when the transfer sheet is laid flat on the bed, and each of the respective diagonal and horizontal localized first attachment means fixedly attach to the matching counterpart respective diagonal and horizontal localized second attachment means, thereby affixing the patient transfer sheet to the bed.

In various embodiments of the bed-to-bed patient transfer sheet, the bed is a stretcher, gurney, hospital bed, cot, or patient transport platform.

In another embodiment of the bed-to-bed patient transfer sheet, the bed comprises at least two rails or bars positioned parallel to a longer length of the bed, each of the at least two rails positioned opposite each other and positioned underneath or next to the bed, to which an equal number of the localized second attachment straps are fixedly attached, wherein the rails or bars are approximately circular in circumference thereby allowing at least the strap end of each of the localized second horizontal attachment straps to wrap around the rail or bar.

In another embodiment of the bed-to-bed patient transfer sheet, the bed further comprises one or more flat, waffled stretcher support structures that are fixedly attached to the at least two rails or bars, wherein at least one of the flat, waffled stretcher support structures is positioned in between the at least two rails and underneath or next to the bed, and where the at least one flat, waffled stretcher support structure provides an additional or alternative equal number of localized strap attachment locations for the first and/or second localized attachment straps in the horizontal plane.

In another embodiment of the bed-to-bed patient transfer sheet, the tubular plastic sheet is comprised of nylon, and wherein the nylon is selected from one or more of nylon 6, nylon 11, nylon 12, nylon 66, nylon 4 6, nylon 6 9, nylon 6 10, nylon 6 11, nylon 6 12, nylon 6/66 copolymer, and nylon 6/12/66 terpolymer. In another embodiment of the bed-to-bed patient transfer sheet, the tubular plastic sheet is comprised of a woven plastic. In another embodiment of the bed-to-bed patient transfer sheet, the tubular plastic sheet is a woven nylon ripstop sheet. In another embodiment of the bed-to-bed patient transfer sheet, the tubular plastic sheet is comprised of a nylon 70×70 denier woven ripstop sheet. In another embodiment of the bed-to-bed patient transfer sheet, the tubular plastic sheet is comprised of one or more of polyketone, polyester, glass-filled nylon, polyethylene, or polyvinylchoride.

In another embodiment of the bed-to-bed patient transfer sheet, the tubular plastic sheet is comprised of fabric-backed plastic sheeting or reinforced plastic sheeting. In another embodiment of the bed-to-bed patient transfer sheet, the tubular plastic sheet comprises an outside surface and an inside surface, where the outside surface and/or the inside surface comprises a coating. In another embodiment of the bed-to-bed patient transfer sheet, the coating comprises polyurethane. In another embodiment of the bed-to-bed patient transfer sheet, the inside surface is coated with an antistatic treatment comprising silicone. In another embodiment of the bed-to-bed patient transfer sheet, the outside surface comprises an impermeable, water-resistant, or water-proof coating which comprises polyurethane. In another embodiment of the bed-to-bed patient transfer sheet, the first attachment straps comprise polyvinylchloride (PVC) coated fibers. In another embodiment of the bed-to-bed patient transfer sheet, the PVC coated fibers are selected from one or more of polyester, natural fiber webbing, synthetic fiber webbing, ultra-high molecular weight polyethylene (UHMWPE) fiber laminated between sheets of polyester, and para-aramid.

In another embodiment of the bed-to-bed patient transfer sheet, the quick-release fastener is comprised of one or more of male hook and female receiver buckles, clasps, clips, hook, and loops. In another embodiment of the bed-to-bed patient transfer sheet, the quick-release fastener is comprised of one or more of plastic, metal, natural fibers, ultra-high molecular weight polyethylene (UHMWPE) fiber laminated between sheets of polyester, and para-aramid. In another embodiment of the bed-to-bed patient transfer sheet, the quick-release fastener possesses a breaking strength of 153 pounds upon mating the male hook and the female receiver together. In another embodiment of the bed-to-bed patient transfer sheet, the localized second attachment straps and comprises a hook comprising a hook count of 324 hooks per square inch and loops comprising a loop count of 740 loops per square inch.

In another embodiment of the bed-to-bed patient transfer sheet, the tubular plastic sheet further comprises one or more barrier layers fixedly attached to an outer surface of the tubular plastic sheet and matching the dimensions of the tubular plastic sheet. In another embodiment of the bed-to-bed patient transfer sheet, the one or more barrier layers are comprised of one or more polymers that do not degrade from multiple rounds of hospital biohazard decontamination procedures. In another embodiment of the bed-to-bed patient transfer sheet, the one or more polymers comprise vinyl. In another embodiment of the bed-to-bed patient transfer sheet, the attachment of the one or more barrier layers is fixedly attached to the to the outer surface of the tubular plastic sheet by stitching, adhesives, or melt bonding. In another embodiment of the bed-to-bed patient transfer sheet, the first straps are fixedly attached to the first edge and the second edge of the tubular plastic sheet by stitching, adhesives, or melt bonding.

In another embodiment of the bed-to-bed patient transfer sheet, the bed is a human bed.

In another embodiment of the bed-to-bed patient transfer sheet, the first and second attachment straps are only in a horizontal plane. In another embodiment of the bed-to-bed patient transfer sheet, the first and second attachment straps do not lie and are not attached in a vertical plane perpendicular to the horizontal plane, and wherein the transfer sheet does not comprise a harness system comprised of vertical attachment straps in the vertical plane.

In another embodiment of the bed-to-bed patient transfer sheet, the number of first localized buckle attachment straps in b) is 8.

In another embodiment of the bed-to-bed patient transfer sheet, the embodiment is a method of transferring a patient, which comprises: (a) providing a transfer sheet that further comprises a number of localized second buckle attachment straps comprising a second localized buckle head-left and head-right attachment straps, second upper middle left and right attachment straps, second lower middle left and right attachment straps, and a second foot-left and foot-right attachment straps, where the localized head-left and head-right second attachment straps, and localized foot-left and foot-right second attachment straps are diagonally attached second attachment straps that are equal in number to the localized first attachment buckle straps, where the localized upper middle left and right second attachment straps, and localized lower middle left and right second attachment straps are horizontally attached localized second attachment straps that are equal in number to the localized first attachment buckle straps, where each of the localized second attachment straps comprise a strap end and a cognate end, where each of the strap ends and each of the cognate ends are positioned opposite of each other on each localized second attachment straps, and where each of the cognate ends comprise affixed thereto a directionally matched attached counterpart localized attachment means that interacts with each of the localized first attachment means to affix each of the localized first attachment straps individually to an individual one of each of the localized second attachment straps via interlocking attachment means and cognate ends, where the bed comprises at least two rails or bars positioned parallel to a longer length of the bed, each of the at least two rails positioned opposite each other and positioned underneath or next to the bed, to which an equal number of the localized second attachment straps are fixedly attached, where the rails or bars are approximately circular in circumference thereby allowing at least the strap end of each of the localized second horizontal attachment straps to wrap around the rail or bar, (b) attaching localized diagonal and horizontal second attachment straps to a first bed, (c) positioning the transfer sheet on top of the first bed with the top open end of the transfer sheet at a head of the first bed and the bottom open end at a foot of the first bed, aligning the localized first diagonal and horizontal attachment straps with the localized second diagonal and horizontal attachment straps such that the attachment means are in proximity of the cognate ends of the localized second attachment straps in the horizontal plane, (d) interlocking the cognate ends with the attachment means for each of the localized first attachment straps and localized second attachment straps, (e) positioning a cloth sheet on top of the transfer sheet, (f) positioning the patient onto the cloth sheet, (g) positioning the first bed such that the first bed is approximately parallel to a second bed, (h) releasing the cognate ends from the localized attachment means only on one side of the first bed, wherein the one side is opposite a second side of the first bed and opposite where the second bed is positioned, and (i) pulling the cloth sheet horizontally from the first bed to the second bed thereby moving the patient from the first bed to the second bed, wherein upon completion of the moving the transfer sheet remains attached via the straps on the second side of the first bed. In another embodiment of the bed-to-bed patient transfer sheet, the embodiment is a method of transferring a patient, wherein the transfer sheet is returned and reattached to the first bed.

In another embodiment of the bed-to-bed patient transfer sheet, the embodiment is a system for transferring a patient, that comprises: a) the patient transfer sheet that further comprises a number of localized second buckle attachment straps comprising a second localized buckle head-left and head-right attachment straps, second upper middle left and right attachment straps, second lower middle left and right attachment straps, and a second foot-left and foot-right attachment straps, where the localized head-left and head-right second attachment straps, and localized foot-left and foot-right second attachment straps are diagonally attached second attachment straps that are equal in number to the localized first attachment buckle straps, where the localized upper middle left and right second attachment straps, and localized lower middle left and right second attachment straps are horizontally attached localized second attachment straps that are equal in number to the localized first attachment buckle straps, where each of the localized second attachment straps comprise a strap end and a cognate end, where each of the strap ends and each of the cognate ends are positioned opposite of each other on each localized second attachment straps, and where each of the cognate ends comprise affixed thereto a directionally matched attached counterpart localized attachment means that interacts with each of the localized first attachment means to affix each of the localized first attachment straps individually to an individual one of each of the localized second attachment straps via interlocking attachment means and cognate ends, and b) a bed, wherein the bed is a stretcher, gurney, hospital bed, portable bed, cot, wheeled cot, army bed, folding bed, patient transport platform, or bed on wheels, where the transfer sheet is placed on top of the bed, and integrating the transfer sheet to the bed by horizontally attaching the localized second attachment straps to the bed and aligning with the localized first diagonal and horizontal attachment straps of the tubular plastic sheet such that they are connecting and securing the transfer sheet to the bed in the horizontal plane.

This Summary is provided to introduce a selection of concepts in a simplified form that are further described below in the Detailed Description. This Summary is not intended to identify critical or essential features of the claimed subject matter, nor is it intended to fully limit the scope of the claimed subject matter described more fully hereinbelow.

BRIEF DESCRIPTION OF THE DRAWINGS/FIGURES

For a more precise understanding of the disclosed patient transfer sheet, and methods of making and using the same, reference is made to specific embodiments thereof illustrated in the drawings. The drawings presented herein are not drawn to scale and any reference to dimensions in the drawings or the following description are with reference to specific embodiments. It will be clear to one of skill in the art that variations of these dimensions are possible while still maintaining full functionality for the intended purpose. Such variations are specifically contemplated and incorporated into this disclosure notwithstanding the specific embodiments set forth in the following drawings.

FIG. 1 is a view of the described patient transfer sheet 100 in assembled form.

FIG. 2A provides isolated views of first localized buckle attachments 114 of the head 104 and foot sections 107 with an attachment means 114.

FIG. 2B provides isolated views of first localized buckle attachments 114 of the head 104 and foot sections 107 with an attachment means 114.

FIG. 2C provides isolated views of first localized buckle attachments 114 of the head 104 and foot sections 107 with an attachment means 114.

FIG. 3 provides a view of the first attachment means 123 with respect to the secondary attachment straps 124.

FIG. 4A provides a further view of the first attachment means 123 and secondary attachment straps 124.

FIG. 4B provides a further view of the first attachment means 123 and secondary attachment straps 124.

FIG. 5A provides an exemplary embodiment depicting how the described patient transfer sheet 100 in assembled form is utilized in transferring a patient from one bed (or gurney) to another.

FIG. 5B provides an exemplary embodiment depicting how the described patient transfer sheet 100 in assembled form is utilized in transferring a patient from one bed (or gurney) to another.

FIG. 5C provides an exemplary embodiment depicting how the described patient transfer sheet 100 in assembled form is utilized in transferring a patient from one bed (or gurney) to another.

FIG. 5D provides an exemplary embodiment depicting how the described patient transfer sheet 100 in assembled form is utilized in transferring a patient from one bed (or gurney) to another.

DETAILED DESCRIPTION

Definitions

Figure 1:
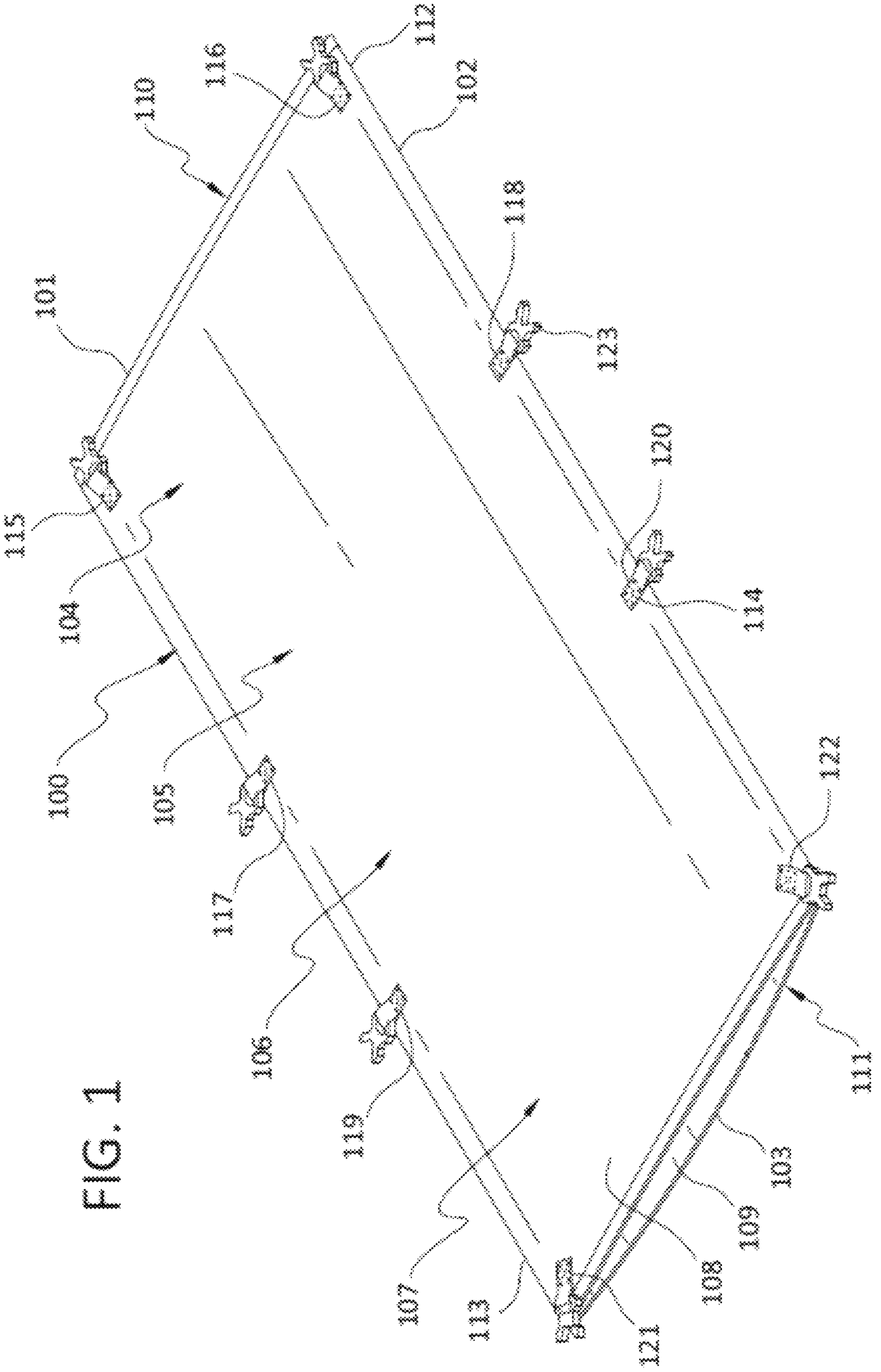

The term "a" or "an" entity as used herein refers to one or more of that entity. As such, the terms "a" (or "an"), "one or more," and "at least one" are herein used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "about" or "approximately" refers to a variation of 10% from the indicated values (e.g., 50%, 45%, 40%, etc.), or in case of a range of values, means a 10% variation from both the lower and upper limits of such ranges. For instance, "about 50%" refers to a range of between 45% and 55%.

Unless defined otherwise, medical terms used herein have the same meaning as commonly understood by one of ordinary skill in the art to which this disclosure is related.

Units, prefixes, and symbols are denoted in their Système International de Unites (SI) accepted form. Numeric ranges are inclusive of the numbers defining the range. The headings provided herein are not limitations of the various aspects or aspects of the disclosure, which can be obtained by reference to the specification as a whole. Accordingly, the terms defined immediately below are more fully defined by reference to the specification in its entirety.

The term "tubular" as used herein means relating to or shaped like a tube.

The term "perpendicular" as used herein means meeting a given line or surface at right angles The term "planar" as used herein means having a two-dimensional characteristic.

The term "plastic" as used herein means relating to a group of synthetic or natural organic materials that may be shaped when soft and then hardened, including many types of resins, resinoids, polymers, cellulose derivatives, casein materials, and proteins: used in place of other materials, as glass, wood, and metals, in construction and decoration, for making many articles, as coatings, and, drawn into filaments, for example, weaving.

The term "horizontally" as it pertains to strap placement and as used herein means at right angles to a vertical line; parallel to level ground.

The term "vertically" as it pertains to strap placement and as used herein means situated at right angles to the horizon; upright.

The term "sewn" as used herein means to be joined or attached by stitches.

The term "attachment means" as used herein means a buckle or other quick-release type device that causes two straps to be physically attached to each other, as defined further hereinbelow.

The term "head" as it pertains to beds as used herein means that part of anything that forms or is regarded as forming the top, summit, or upper end, such as the head of a bed, stretcher, or other platform.

The term "foot" as it pertains to bed as used herein means the lowest part, or bottom, of anything, such as the foot of a bed, stretcher, or other platform.

The term "patient" as used herein means a person who is under medical attention, care, or treatment. The patient is in some instances a human, but in other instances is any animal such as, for instance, a horse, cow, goat, sheep, monkey, dog, cat, and the like.

Patient Transfer Sheet

In the day-to-day operations of an ambulance, EMS (emergency medical service) personnel will have multiple movement points in the transport and/or transfer of invalids, patients, injured persons or others needing assistance that subsequently become patients, from a bed to a gurney at a person's residence or care facility, then from a gurney to hospital gurney and then subsequently a hospital bed.

In an EMS vehicle, there is an ever-present need to move non or only partially ambulatory patients out of a bed or away from and accident scene, onto a gurney, then transferred to a hospital, laboratory, treatment, or recovery location in the hospital, or other off-site biomedical or health-care based location. The patient is moved from the gurney onto a hospital bed or gurney headed for an operating table, examination room, laboratory, treatment, or recovery at such locations. Such transportation or transference from the gurney of an EMS vehicle include both the changing of elevation of the patients center of gravity in an out of the EMS vehicle, but also "lateral" transfers, i.e., not typically involving changing the elevation of the patient's center of gravity. Therefore, there are biomechanical loads with at times difficult positioning to and from a bed to a gurney in addition to typical lateral movements that are resolved by rolling and/or sliding operations made during the transfer.

Likewise, in the day-to-day operations in a hospital or health-care based facility, which includes an operating room, examination, laboratory, treatment, or recovery locations, patients frequently are moved from one surface to another surface. In many instances, patients are not ambulatory and are moved via a gurney with the assistance of nursing and/or biomedical staff. For example, when a patient undergoes surgery, even an ambulatory patient may be rendered non-ambulatory by virtue of the operation and/or due to the effects of anesthesia. Non-ambulatory patients typically are moved via a gurney whenever there is a need to move a patient to a new area. For example, when an ambulance arrives with a patient, or when a patient is finished with surgery, the nursing and/or biomedical staff typically transfer the patient to a new gurney for transport from the ambulance to the surgery room, or the surgery room to the recovery room. Generally, the patient stays on the gurney while in the recovery room. Upon recovery, the patient is again moved on the gurney to the hospital room. Once at the hospital room, the patient is moved from the gurney to the hospital bed by nursing and/or biomedical staff.

In a hospital or health-care based facility, there is also an ever-present need to move non or only partially ambulatory patients into and out of bed, onto or off of a gurney, or onto or off of an operating table, and to transfer the patient from one to another. These are all essentially "lateral" transfers, i.e., they do not typically involve changing the elevation of the patient's center of gravity, where rolling and/or sliding operations are typically sufficient to provide for the transfer.

It is also contemplated that the disclosed patient transfer sheet are used for human patients as well as being applicable in the veterinary field in the transfer of animals (dogs, horses, cows, pigs, etc.) from one bed (gurney or table) to another.

The described transfer sheet is designed for care providers to assist in the physical movement and lateral transfer of a patient from one surface to another, e.g., from a prehospital stretcher to a hospital bed. It should remain in place under the patient and secured to the stretcher's frame until the providers are ready to perform the transfer. Once ready, providers simply need to release the buckles on the outer edge and gently glide the patient over to the other surface.

Patient Transfer Sheet Details

Provided herein is a patient transfer sheet 100 as exemplified in the figures below.

FIG. 1 is a view of the described patient transfer sheet 100 in partially assembled form. In this embodiment of the described patient transfer sheet, the patient transfer sheet comprises a tubular plastic sheet with a short dimension 101 and a long dimension 102 perpendicular to each other lying in a single plane and describing a rectangular shape of the tubular plastic sheet 103. The tubular plastic sheet is planar, and in a linear direction, has a head section 104, an upper 105 and lower 106 middle section, and a foot section 107. The plastic sheet has an outside surface 108 and an inside surface 109, where the outside surface is located on an opposite side of the inside surface and together form a tube shape. The plastic sheet has a top open end 110 and a bottom open end 111 formed at opposite ends of the tubular plastic sheet, each having a diameter in the short dimension of the tubular plastic sheet and located perpendicular to the outside surface and inside surface. The plastic sheet also has a first edge 112 and a second edge 113 formed opposite each other in the long dimension, where the first edge 112 and second edge 113 are parallel to each other and each perpendicular to the short dimension. The patient transfer sheet also has 6 to 8 first localized buckle attachment straps 114 that are positioned in the head section 104, upper 105 and lower 106 middle sections, and foot section 107. The first localized buckle attachment straps comprise a first localized buckle head-left 115 and head-right 116 attachment straps, an upper middle left 117 and right 118 attachment straps, a lower middle left 119 and right attachment straps 120, and a foot-left 121 and foot-right 122 attachment straps.

Figure 2A:
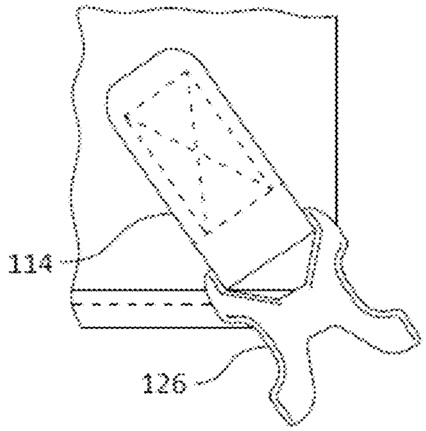
Figure 2B:
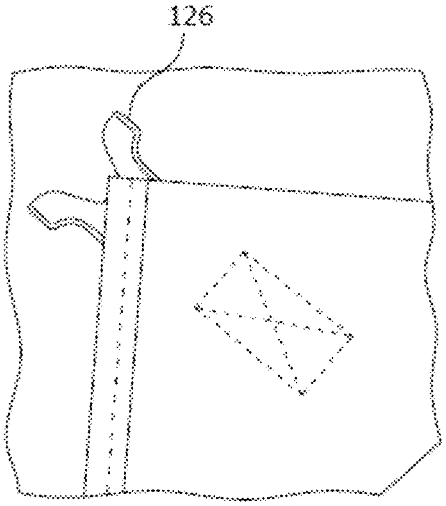
Figure 2C:
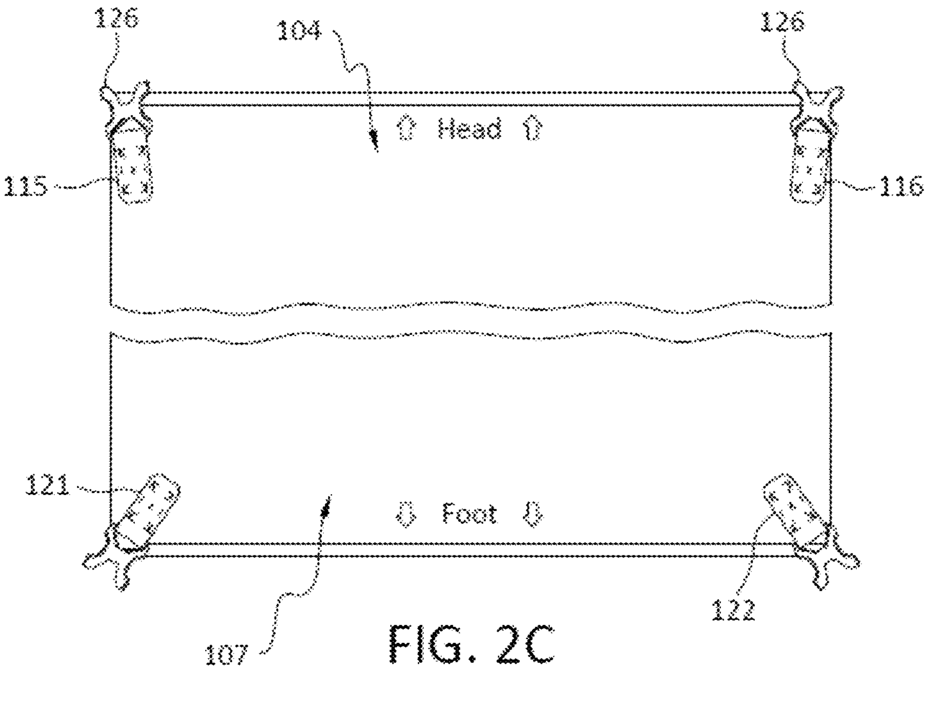

FIGS. 2A, 2B, and 2C provide isolated views of first localized buckle attachments 114 of the head 104 and foot sections 107 with an attachment means 126. Such attachments means are further depicted as the cognate end 126 of the attachment means of the first localized buckle head-left 115 attachment strap, head-right 116 attachment strap, foot-left 121 attachment strap, and foot-right 122 attachment straps.

Figure 3:
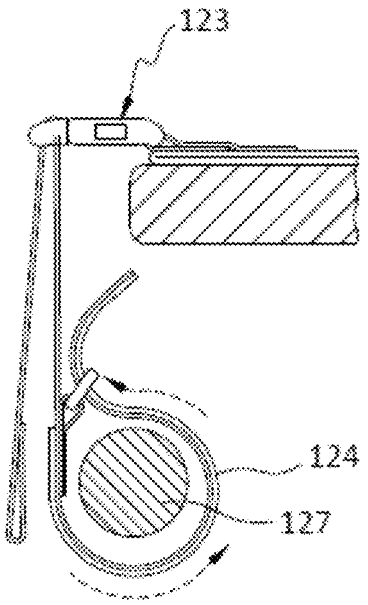

FIG. 3 provides a view of the first attachment means 123 with respect to the secondary attachment straps 124.

Figure 4A:
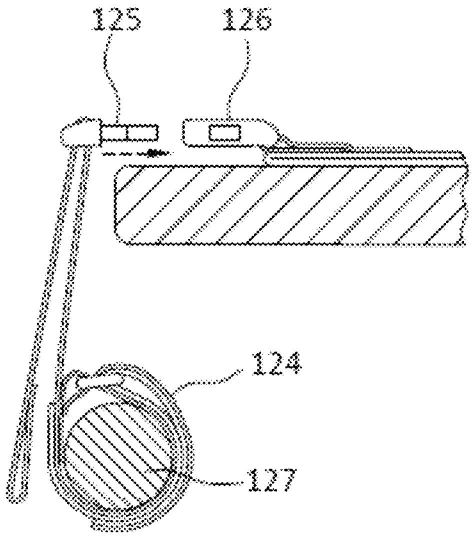
Figure 4B:
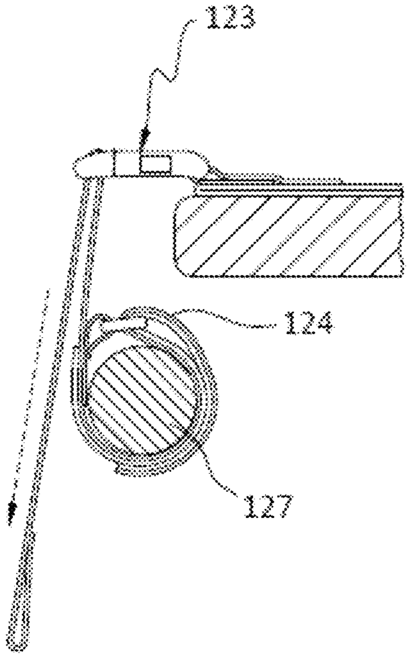

FIGS. 4A and 4B provide a further view of the first attachment means 123 and secondary attachment straps 124, where the second attachment straps 124 comprise a directionally matched localized attachment means 125 which interacts with counterpart cognate end 126 on the first localized attachment strap 114. The directionally matched attachment means end 125 interacts with the counterpart cognate end 126 are positioned opposite of each other on each localized strap, and are interlocked together to form first attachment means 123.

FIGS. 5A, 5B, 5C, and 5D provides an exemplary embodiment depicting how the described patient transfer sheet 100 in assembled form is utilized in transferring a patient from one bed (or gurney) to another. For instance, in FIG. 5A, the described patient transfer sheet 100 in assembled form is attached to a gurney (or bed). As indicated, the described patient transfer sheet 100 in assembled form is attached onto the top surface of a gurney (or bed). As exemplified, the patient transfer sheet 100 is orientated on the gurney (or bed) where the head 104 section is located at the elevated portion of the gurney and the foot section 107 is located at the middle portion of the gurney. The first attachment means located at the first localized buckle head-left 115, head-right 116 attachment straps, upper middle left 117, upper middle right 118 attachment straps, lower middle left 119, lower middle right attachment straps 120, foot-left 121 and foot-right 122 attachment straps were attached to directionally matched counterpart cognate ends at the localized second buckle head-left 128 attachment strap, head-right 129 attachment strap, upper middle left 130 attachment strap, upper middle right 131 attachment strap, lower middle left 132 attachment strap, lower middle right attachment strap 133, foot-left 134 attachment strap and foot-right 135 attachment strap. In FIG. 5B, as exemplified, the above prepared gurney (or bed) with the above patient transfer sheet 100, a bed sheet above the transfer sheet, and patient is brought to a second bed. In FIG. 5C, as exemplified, medical personnel detaches one side of the buckle attachments which are farthest from the second bed (e.g., the above right-side attachments). In FIG. 5D, as exemplified, medical personnel on the opposite side (e.g., left side) of the second bed, grab the top bed sheet and pull toward the left side of the second bed. The action of pulling facilitates the movement of the bed sheet, patient transfer sheet 100, and patient to the second bed.

Figure 6:
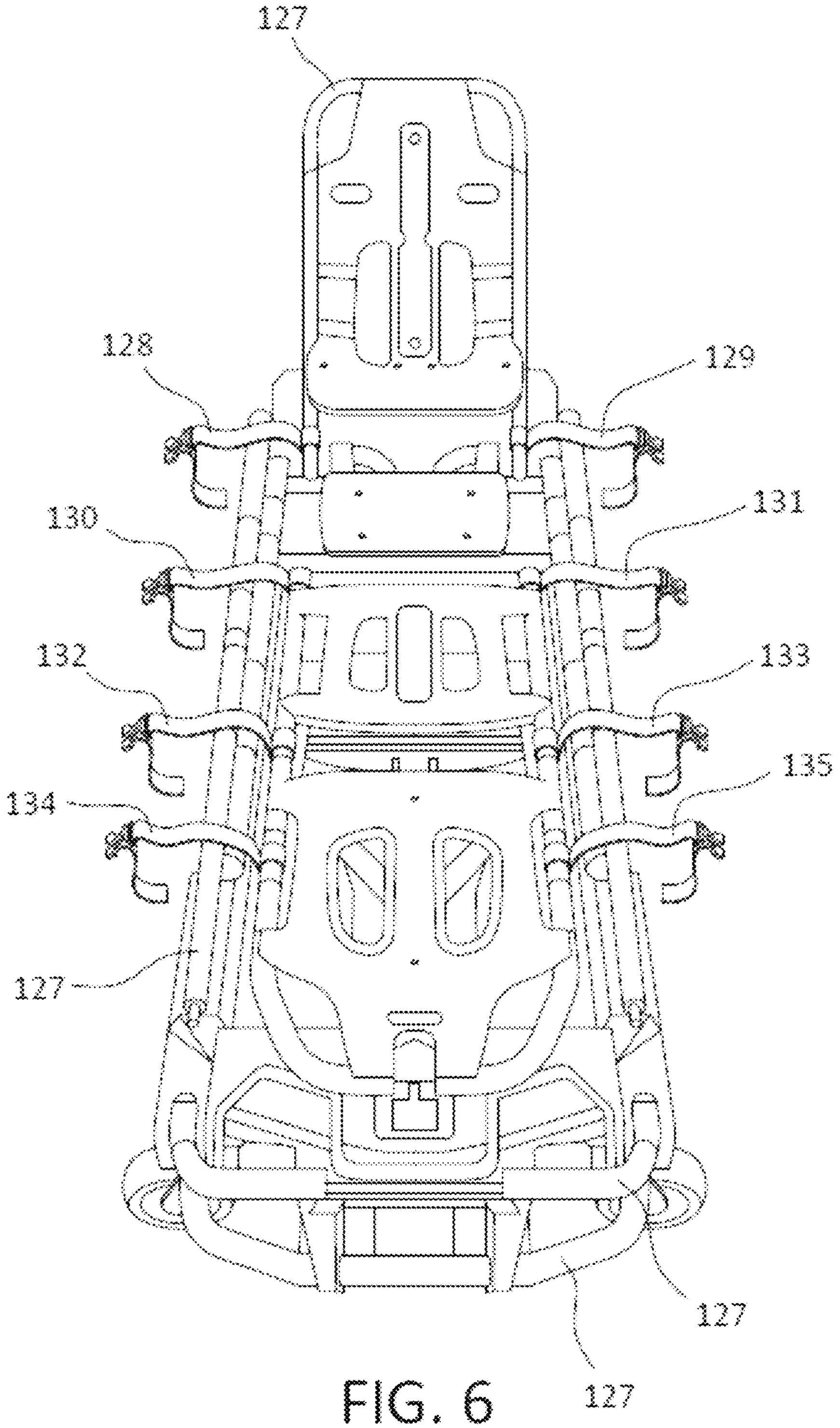
FIG. 6 depicts contemplated embodiments of the attachment locations on a gurney (or bed) as exemplified on a STRYKER® gurney.
Figure 7:
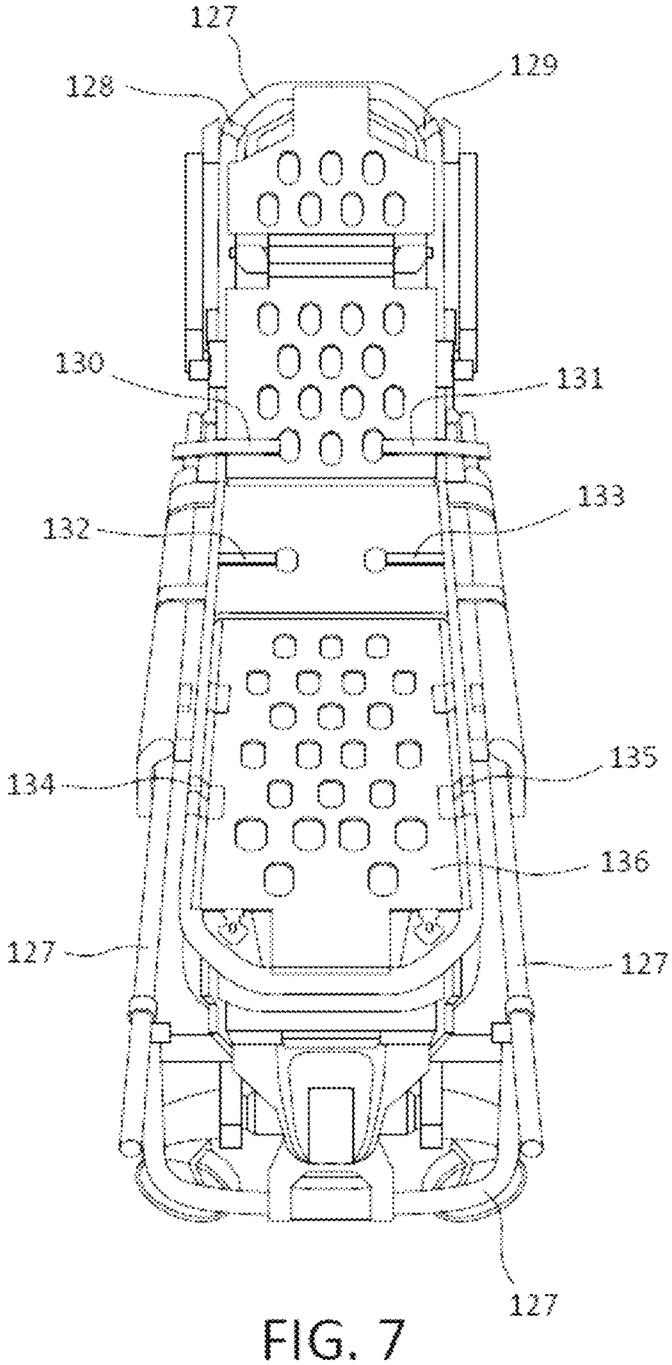
FIG. 7 depicts further contemplated embodiments of the attachment locations on a gurney (or bed) as exemplified on a FERNO® gurney.
Figure 8:
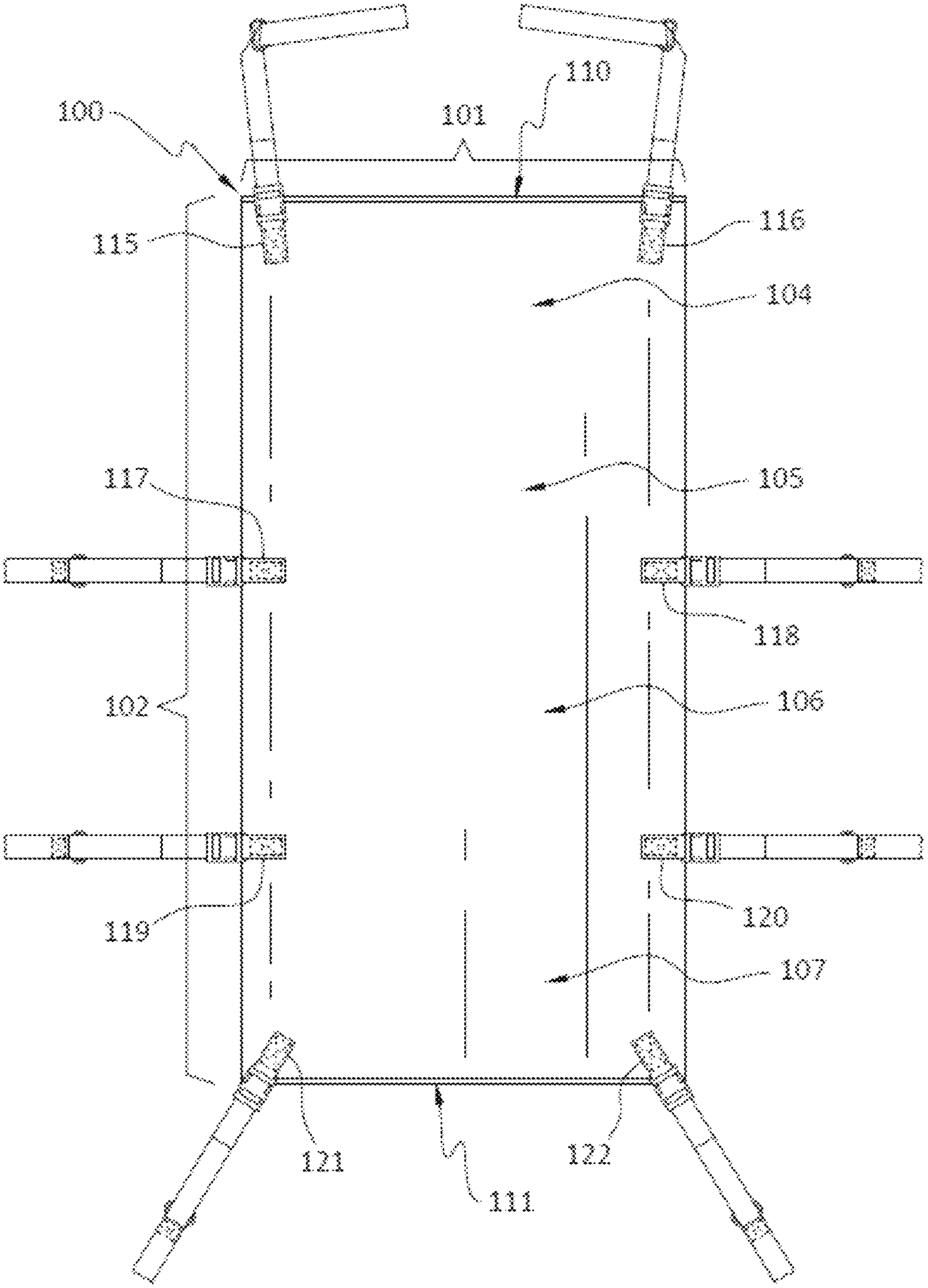
FIG. 8 is an alternative flat planar view of the described patient transfer sheet 100 in assembled form.

FIGS. 6 and 7 depict contemplated embodiments of the attachment locations on a gurney (or bed) as exemplified on STRYKER® and FERNO® gurneys, respectively. The gurney (or bed) comprises at least two rails or bars 127 positioned parallel to a longer length of the bed, each of the at least two rails 127 positioned opposite each other and positioned underneath or next to the bed, to which an equal number of the localized second attachment straps are fixedly attached, wherein the rails or bars 127 are approximately circular in circumference thereby allowing at least the strap end of each of the localized second horizontal attachment straps to wrap around the rail or bar 127. An equal number of localized second attachment straps are fixedly attached to the rails or bars 127 where the matched counterpart cognate ends 126 at the localized second buckle head-left 128 attachment strap, head-right 129 attachment strap, upper middle left 130 attachment strap, upper middle right 131 attachment strap, lower middle left 132 attachment strap, lower middle right attachment strap 133, foot-left 134 attachment strap and foot-right 135 attachment strap locations FIG. 8 is an alternative flat planar view of the described patient transfer sheet 100 in assembled form. In this embodiment of the described patient transfer sheet, the patient transfer sheet comprises a tubular plastic sheet with a short dimension 101 and a long dimension 102 perpendicular to each other lying in a single plane and describing a rectangular shape of the tubular plastic sheet 103. The tubular plastic sheet is planar, and in a linear direction, has a head section 104, an upper 105 and lower 106 middle section, and a foot section 107. The plastic sheet has an outside surface 108 and an inside surface 109, where the outside surface is located on an opposite side of the inside surface and together form a tube shape. The plastic sheet has a top open end 110 and a bottom open end 111 formed at opposite ends of the tubular plastic sheet, each having a diameter in the short dimension of the tubular plastic sheet and located perpendicular to the outside surface and inside surface. The plastic sheet also has a first edge 112 and a second edge 113 formed opposite each other in the long dimension, where the first edge 112 and second edge 113 are parallel to each other and each perpendicular to the short dimension. The patient transfer sheet also has 6 to 8 first localized buckle attachment straps 114 that are positioned in the head section 104, upper 105 and lower 106 middle sections, and foot section 107. The first localized buckle attachment straps comprise a first localized buckle head-left 115 and head-right 116 attachment straps, an upper middle left 117 and right 118 attachment straps, a lower middle left 119 and right attachment straps 120, and a foot-left 121 and foot-right 122 attachment straps.

In general, gurneys (or stretchers) amenable to the described patient transfer devices vary in overall design and complexity depending on the subject intended to be carried upon the horizontal surface thereof. Non-exhaustive examples of such variability include, but are not limited to, gurneys that have a fixed vertical height or are adjustable to collapse to a lower height to be utilized in emergency vehicles, gurneys with flat transport mattress pads, or those with molded segmented mattress pads. Other examples include, but are not limited to, flat transport areas, as well as those that have adjustable headrest areas to raise the upper body. Still another example includes, but is not limited to open gurneys and those with attached collapsible bedrails that secure a patient on the gurney. In view of such varying design elements, the tube framing of gurneys will also vary based on basic to complex features on the gurney (or stretcher). Common stretcher types include, but are not limited to, gurneys from manufacturers such as STRYKER® or FERNO®. Non-limiting examples of such stretchers are provided, for instance, in FIGS. 6 and 7. It is noted that the dimensions of the described patient transfer sheet should, as far as feasible, match the gurney (or stretcher) type so that the device operates most effectively without unnecessary excess material that could hamper the transfer action.

With regard to the beds onto which the described patient transfer device may be deployed, such medical beds include, but are not limited to, a stretcher, gurney, hospital bed, cot, or patient transport platform. Variability in design and complexity as discussed above also applies to medical beds. Therefore, dimensions of the patient transfer sheets should, to a reasonable degree, but need not necessarily, match the bed type and size.

The size of the bed, and thus to some degree the size of the described patient transfer device, as mentioned previously, will vary depending on intended use, manufacturer, and model types. If the intended subject to be transferred is, for instance, a human being, then the stretcher as well as the described patient transfer device, would be appropriately sized for this purpose. Such stretchers and beds also exist in the art for other animals, such as cattle, horses, pigs, and other livestock, as well as aquatic creatures such as dolphins, otters, fish, and amphibians. Thus, the described patient transfer device is contemplated to be very useful in the transfer of any type of patient, be that patient human or other member of the animal kingdom, or even other species treated within the veterinarian field and who possess a certain amount of weight making transfer of the subject from one bed to another difficult and dangerous due to friction, weight, and gravity considerations.

The presently disclosed patient transfer sheet 100 begins with the core component of a tubular plastic sheet. (See, FIG. 1). The shape of the tubular plastic sheet of the patient transfer sheet described herein is not particularly constrained except that it is large enough to accommodate different sizes of gurneys.

As depicted in FIG. 1, an embodiment of the patient transfer sheet is described. Thus, the patient transfer sheet 100 in some embodiments is comprised of one or more of nylon 6, nylon 11, nylon 12, nylon 66, nylon 46, nylon 6 9, nylon 6 10, nylon 6 11, nylon 6 12, nylon 6/66 copolymer, and nylon 6/12/66 terpolymer. Further, in some embodiments, the tubular plastic sheet is comprised of a woven plastic.

In another embodiment, the patient transfer sheet has curved or rounded edges and is shaped like an oval. In other embodiments, the patient transfer sheet comprises a rectangular-shaped sheet.

The patient transfer sheet comprises an outside surface, an inside surface, a top open end, a bottom open end, a first edge, and a second edge, wherein the top open and the bottom open end are located opposite each other, and wherein the first edge is opposite of the second edge, b) 6 to 8 first straps evenly divided and evenly spaced and sewn into or otherwise permanently affixed to the first edge and the second edge of the tubular plastic sheet, such that 3 to 4 of the straps are present on each of the first edge and the second edge, c) an attachment means permanently attached to each of the straps.

The tubular plastic sheet is about 3 to 6 feet by about 2 to 4 feet in size when laid flat, approximately matching a surface area of a stretcher or a hospital bed, with the top end laid on at a head of the stretcher or the hospital bed, and the top end laid at a foot of the stretcher or the hospital bed.

Composition of Transfer Sheet

The patient transfer sheet 100 is comprised of materials capable of supporting the weight of one or more humans without collapsing. The patient transfer sheet 100 is flexible, and composed of core components including a tubular plastic sheet, straps that are sewn into or otherwise permanently affixed to the tubular plastic sheet, and attachment means permanently attached to each of the straps.

The materials of the patient transfer sheet are positioned such that this weight of one or more humans without collapsing is supported. Non-limiting examples of such materials include, but are not limited to, composites, plastics, carbon fiber, one or more of polyketones, polyesters, glass-filled nylon, polyethylene, or polyvinylchoride.

Possible coatings of transfer sheet can include but are not limited to polyurethane or silicone.

Optionally, in one embodiment, the tubular plastic sheet is comprised of fabric-backed plastic sheeting or reinforced plastic sheeting.

In another embodiment of the bed-to-bed patient transfer sheet, the tubular plastic sheet comprises an outside surface and an inside surface, where the outside surface and/or the inside surface comprises a coating.

In another embodiment of the bed-to-bed patient transfer sheet, the coating comprises polyurethane.

In another embodiment of the bed-to-bed patient transfer sheet, the inside surface is coated with an antistatic treatment comprising silicone.

In another embodiment of the bed-to-bed patient transfer sheet, the outside surface comprises an impermeable, water-resistant, or water-proof coating which comprises polyurethane.

Transfer Sheet Straps and Placement of Straps

The patient transfer sheet 100 core components further comprise at least six to eight straps. The position of the straps is not particularly limited but in one particular embodiment one of each strap is reversibly attached to the patient transfer sheet generally in the following eight areas of the patient transfer sheet: as depicted in FIG. 1.

In another particular embodiment it is noted that each first localized buckle attachment straps is positioned only in the head section, upper and lower middle sections, and foot section of the patient transfer sheet 100. The first localized buckle attachment straps are each attached to the sheet and are located in the head section with a first localized buckle head-left and head-right attachment straps, located in the upper middle section with an upper middle left and right attachment straps, located in the lower middle section with a lower middle left and right attachment straps, and located in the foot sections with a foot-left and foot-right attachment straps. For each section, each of the first localized buckle attachment straps are located opposite each other. Each of the first localized attachment straps in each section is rectangular in shape and comprises a long dimension and a short dimension. It is noted that the localized first buckle head-left and head right first attachment straps, and localized first buckle foot-left and foot-right attachment straps are diagonally affixed on each of the first edge and the second edges. The localized first buckle upper middle left and right attachment straps, and localized first buckle lower middle left and right attachment straps are horizontally affixed on each of the first edge and the second edge.

Furthermore, the straps are attached to the tubular plastic sheet, i.e., the patient transfer sheet, where they are evenly divided and evenly spaced and sewn into or otherwise permanently affixed to the first edge and the second edge of the tubular plastic sheet, such that 3 to 4 of the straps are present on each of the first edge and the second edge. There are also attachment means permanently attached to each of the straps.

Such an arrangement is different than what is known in the technical field since typically a sheet is secured by horizontal and vertical straps that are attached together in a matrix format that lie underneath a stretcher or mattress, and then attached to the sheet above with Velcro-type straps that are secured to matrix format straps below. Therefore, such an arrangement in the technical space provides for sheets that are secured by both horizontal vertical lines of straps that run underneath the mattress or stretcher, thereby resulting in a cumbersome transfer sheet to set up, deploy and then reset.

The present invention does not conform to such known techniques for sheets in the technical space. As noted above, the patient transfer sheet of the present invention 100 provide localized attachments of the sheet in specific sections of the sheet where for each section the attachment straps are directly secured to the gurney (or stretcher) tube attachment points. Additionally, as noted above, the localized first buckle head-left and head right first attachment straps, and localized first buckle foot-left and foot-right attachment straps are diagonally affixed on each of the first edge and the second edges of the sheet. The localized first buckle upper middle left and right attachment straps, and localized first buckle lower middle left and right attachment straps are horizontally affixed on each of the first edge and the second edge. How the localized attachment straps are configured eliminates the need for a matrix format of straps that lie underneath a stretcher or mattress to secure the transfer sheet.

As indicated in FIGS. 5A, 6, and 7, the patient transfer sheet described herein 100 provides localized attachments that avoids such a matrix strap configuration since the attachment straps of the present invention are locally attached in a diagonal or horizontal direction (as discussed above) directly to the tubes of the gurney (or stretcher). This design allows for an efficient and more simple attachment setup and deployment of the patient transfer sheet 100 when transferring a patient to another bed or gurney (see FIGS. 5A to 5D).

In an alternative embodiment, the patient transfer sheet comprises additional straps (not depicted) that are attached to generic locations on a stretcher, where there are open areas on the tube portions of the stretcher.

Composition of Straps

In another embodiment of the patient transfer sheet, the first attachment straps are comprised of, for instance, polyvinylchloride (PVC), or PVC-coated fibers.

In another embodiment of the bed-to-bed patient transfer sheet, the PVC-coated fibers are selected from one or more of polyester, natural fiber webbing, synthetic fiber webbing, ultra-high molecular weight polyethylene (UHMWPE) fiber laminated between sheets of polyester, and para-aramid.

In another embodiment, the first attachment straps, above, include but are not limited to, a number of straps ranging from, 6, 7, 8, 9, 10, and 12 straps, or from six to eight straps, or 6 to 10 straps. Further, in some embodiments, such straps are added or removed to a transfer patient sheet based on the type of gurney utilized, as explained above. That is, various different stretchers or gurneys from different manufacturers may require a different number of straps to ensure secure attachment of the patient transfer device thereto.

In another embodiment, the first attachment straps, above, include but are not limited to, straps with sizes of approximately one-inch widths or more based on availability from manufacturers. The width of the straps, in various embodiments, are from 1 to 2 inches, or from 0.5 to 2.0 inches, or about 0.5, 0.75, 1.0, 1.25, 1.5, 1.75, 2.0, or even 2.5 inches in width depending on the amount of strength desired, the number of straps employed, and the type of material used to manufacture the straps.

In another embodiment, the first attachment straps, above, include but are not limited to, different strap placements, depending on the type of stretcher from manufacturers, as well as particular stretcher models.

Attachment Means

The term “attachment means” as used herein means, in general, accessories that allow the patient transfer sheet to be secured to the gurney (or stretcher) by way of a male and female counterpart or cognate attached to opposite ends of a strap that, upon mating, “lock” and link the straps together from the gurney and counterpart strap attached to the patient transfer sheet. Such accessories are useful in attaching one strap to another strap securely include, but are not limited to, male and female counterparts in the form of a male hook and a female receiver buckle, clasps, clips, hooks, and loops.

The patient transfer sheet needs to have such attachment means that have the ability to be very secure, yet easily reversible and released, so that patient transfer from one gurney to another (or bed) is quickly accomplished in emergency situations where time is of the essence.

FIGS. 2A, 2B, 2C, 3, 4A, and 4B provide various non-limiting embodiments of attachment means contemplated herein. For instance, in one embodiment, the attachment means is a shaped buckle as in FIGS. 2A, 2B, 2C, 4A, and 4B. Such shaped buckles are, in some embodiments, in the shape of a square, rectangle, tapered rectangle and oval and that are made of plastic or metal. Such buckles are known in the art and are available by manufacturers such as Woojin Plastics Co., Ltd. (Korea). Exemplary embodiments of such attachment buckles or clasps include, but are not limited to, kross buckles, dragon tension locks, micro insert zipper pulls, tension G hooks, low profile center push buckles, double squeeze stoppers, toggle straps, beam pullers, sternum buckles, zip clips, swivel hooks, ratchet buckles, reversible buckles, side release buckles, plate buckles, cam buckles, spring buckles, military buckles, slide buckle, pin buckles, roller buckles, anchor buckles, box, and the like, many of which are quick-release type clasps and buckles.

Other Components Including Additional Top Layers

The patient transfer sheet, while comprising the main core components described above, additionally may comprise one or more optional components described hereinbelow. These optional components are add-ons that the biomedical or medical personnel may choose to select to customize the patient transfer sheet to support a specific need, situation, or goal.

Optionally, the described the patient transfer sheet optionally also comprises one or more additional covering sheets or layers attached to a top part of the main patient transfer sheet, which are utilized for ease of cleaning and disinfection of the transfer sheet prior to reuse. That is, in certain embodiments, additional layers are securely attached on top of the patient transfer sheet, where institutionalized cleaning and sterilization regimens require a particular substrate surface for biohazard remediation. Such layers are, in some embodiments, bonded directly to the top of the patient transfer sheet materials so that they are not removable therefrom or able to be separated. In such an embodiment the transfer sheet remains a single sheet but has additional optional layers on top. Such additional cloth (or other layers) are optionally adhered to the top side of the transfer sheet via known techniques.

These additional optional layers can vary depending on the specific requirements of various contexts in which the patient transfer sheet is deployed. For instance, in some states within the US, certain regulations require that all surfaces be decontaminated using specified protocols and chemicals prior to reuse. In such situations, the patient transfer sheet optionally comprises one or more additional layers comprised of materials that are amenable to be cleaned by way of these regulated cleaning protocols. In other instances, such as where the patient requires certain comfort padding, the additional optional layers may include a certain thickness to allow for comfort of the subject while laying on the patient transfer sheet. In some instances the optional additional layers include water-proof layers to accommodate aquatic live stock and the like. These optional additional layers are in some instances directed bonded to the patient transfer sheet so that the entire sheet is able to be cleaned together in one operation. In other instances, the optional additional layers are detachable for separate cleaning.

Methods of Patient Transfer with the Transfer Sheet

The described patient transfer sheet 100 is designed for ease of customization, ease of portability, and ease of use in multiple environments.

To anchor the transfer sheet to the gurney (or stretcher) the transfer anchor placement guide is referred to in order to determine the recommended anchor attachment points specific to stretcher’s make and model being employed.

Next, each label sewn under the plastic loop on each anchor is reviewed to determine its proper placement on the stretcher.

Each anchor is secured to the gurney's (or stretcher's) frame by threading the distal end under the stretcher frame and back up through the plastic loop. Then, the distal end of the anchor is brought back onto itself and the hook-and-loop materials are fastened together. See FIGS. 3, 4A, 4B, 5A, and 8.

The described the patient transfer sheet is deployed by first raising the stretcher backrest to what is known in the technical space as the "Semi-Fowler position."

Next, the patient transfer sheet is placed upon the on the stretcher directly or the stretcher mattress with the label facing up, and aligning the head end just below the stretcher's headrest (see FIGS. 1 and 5A)

Beginning with the localized first buckle upper middle left and right attachment straps, and localized first buckle lower middle left and right attachment straps, all of the horizontal direction attachment straps from the patient transfer sheet are secured to the gurney (or stretcher). See FIGS. 3, 4A, 4B, and 5A. Once these are secured, the attachment straps located in the head and foot sections are then secured as discussed above.

Next, the patient transfer sheet 100 is evenly spaced across the gurney (stretcher or mattress), and the attachment straps are tightened until the patient transfer sheet is pulled tight. The patient transfer sheet is now ready to be deployed. Prior to use with a patient, the gurney (or stretcher) with the patient transfer sheet has a regular bedsheet placed over the patient transfer sheet. The gurney (or stretcher) is ready for use in the field. Subsequently, the patient is then placed upon the gurney (or stretcher).

Once the patient transfer sheet 100 ready to transfer a patient, both surfaces (the gurney with the patient transfer sheet, and the bed or gurney the patient is to be transferred to) are prepared for patient transfer according to department protocols and guidelines.

Next, the patient is wheeled next to and parked parallel to the bed (gurney or mattress) where the wheels are locked down to avoid movement away from the transferring bed. See FIGS. 5A, and 5B.

The patient transfer sheet 100 is released from the anchors along the outside edge of the stretcher. (See FIG. 5C).

Medical personnel then gently glide the patient over to the adjacent surface by pulling on the bed sheet that was placed over the patient transfer sheet. It is noted that the actual patient transfer sheet is not pulled upon, only the bed sheet is pulled. (See FIG. 5D).

Once the patient is secured onto the transferring bed, the gurney (or stretcher) is removed and the patient transfer sheet is optionally cleaned, disinfected, and reset onto the gurney (or stretcher) with a fresh bedsheet over the patient transfer sheet.

Thus, described herein are methods of using the patient transfer sheet for the purpose of transferring a subject in need thereof from one horizontal surface, such as a gurney or bed or stretch, to a second horizontal surface, thereby allowing the first surface to be redeployed elsewhere and freed up as needed.

EXAMPLES

Additionally provided are illustrative and non-limiting examples that provide a better understanding of the manufacture of the transfer sheet and of its many advantages. The following examples are included to demonstrate preferred embodiments. It should be appreciated by those of skill in the art that the techniques disclosed in the following examples that follow represent techniques that work well in the industry for manufacturing, and thus are considered to constitute preferred modes for practice. However, those of skill in the art should, in light of the present disclosure, appreciate that many changes can be made in the specific embodiments and still obtain a like or similar result without departing from the spirit and scope of the disclosed processes.

Example 1: Cutting Raw Materials of the Patient Transfer Sheet

The patient transfer sheet is manufactured by starting with fabric material applicable for the use in a medical, or health care related setting.

Cut the polyurethane-silicone coated Care 150 nylon fabric material into rectangular sections according to the dimensions of the patient transfer sheet model being assembled. Each cut piece will have a top end, a bottom end, a first edge, a second edge, an outside surface, and an inside surface.

Example 2: Creating the Tube within the Patient Transfer Sheet

Create a cylinder by taking two of the cut pieces from Example 1 and use serger sewing machine to attach the first and second edges of each piece to each other. The inside surface of each piece should be the inside of the cylinder and the outside surface of each piece create the outside surface of the cylinder.

Example 3: Manufacturing Attachment Straps

Cut the polyester BETA 520 strap webbing into eight (8) 3.5-inch pieces.

Loop one end of the strap through the receiver buckle and back onto itself. Use a Bartack sewing machine to permanently affix 8 receiver buckles evenly divided along the first and second edges of the cylinder according to the spacing and angles of the model being assembled (See FIGS. 3A, 4A, and 4B).

Example 4: Assembling the Patient Transfer Sheet

In Step 1: Top Right Anchor Strap (Head Right Attachment Strap)

Create the Anchor Strap by cutting the polyester BETA 520 strap webbing into the appropriate lengths for the model being assembled. Hook and Loop (Velcro) is then cut into the appropriate length for the model being assembled.

Sew the Velcro Hook to the proximal end of the Anchor Strap and the Velcro Loop adjacent to the Velcro Hook.

Thread the distal end of the Anchor Strap through the adjustability section of a Hook (Male) Buckle.

Sew two folds approximately 1.5 inches apart on the distal end of the Anchor Strap to help prevent the Hook (Male) Buckle from accidentally sliding off the Anchor Strap.

Fold the Anchor Strap over onto itself, with the fold located near the distal end of the Velcro Loop, and then rotate the distal end of the Right Anchor Strap to the right 90 degrees. Use a post sewing machine to permanently affix the strap to the patient transfer sheet.

Top Left Anchor Strap (Head Left Attachment Strap)

Create the Anchor Strap by cutting the polyester BETA 520 strap webbing into the appropriate lengths for the model being assembled. Then cut the Hook and Loop (Velcro) into the appropriate length for the model being assembled.

Sew the Velcro Hook to the proximal end of the Anchor Strap and the Velcro Loop adjacent to the Velcro Hook.

Thread the distal end of the Anchor Strap through the adjustability section of a Hook (Male) Buckle.

Sew two folds approximately 1.5 inches apart on the distal end of the Anchor Strap to help prevent the Hook (Male) Buckle from accidentally sliding off the Anchor Strap.

Fold the Anchor Strap over onto itself, with the fold located near the distal end of the Velcro Loop, and then rotate the distal end of the Anchor Strap to the left 90 degrees. Use a post sewing machine to permanently affix.

In Step 2: For each of the Top Right and Top Left Anchor Straps, create the Loop Strap by cutting the polyester BETA 520 strap webbing into a 3.5-inch section. Loop one end of the cut section through the Plastic Square Loop AP036 and back onto itself. Then use a Bartack sewing machine to permanently affix the Plastic Square Loop AP036 to the Anchor Strap surface opposite of the distal end of the Velcro Loop.

Middle Anchors Straps (Upper Middle Right, Upper Middle Left, Lower Middle Right, and Lower Middle Left Attachment Straps)

Create the Anchor Strap by cutting the polyester BETA 520 strap webbing into the appropriate length for the model being assembled. Then cut the Hook and Loop (Velcro) into the appropriate lengths for the model being assembled.

Sew the Velcro Hook to the proximal end of the Anchor Strap and the Velcro Loop adjacent to the Velcro Hook.

Thread the distal end of the Anchor Strap through the adjustability section of a Hook (Male) Buckle.

Use a post sewing machine to permanently affix two folds approximately 1.5 inches apart on the distal end of the Anchor Strap to help prevent the Hook (Male) Buckle from accidentally sliding off the Anchor Strap.

Create the Loop Strap by cutting the polyester BETA 520 strap webbing into a 3.5-inch section. Loop one end of the cut section through the Plastic Square Loop AP036 and back onto itself. Then use a Bartack sewing machine to permanently affix the Plastic Square Loop AP036 to the Anchor Strap surface opposite of the distal end of the Velcro Loop.

Bottom Anchors (Foot-Right and Foot-Left Attachment Straps):

Create the Anchor Strap by cutting the polyester BETA 520 strap webbing into the appropriate length for the model being assembled. Then cut the Hook and Loop (Velcro) into the appropriate lengths for the model being assembled.

Sew the Velcro Hook to the proximal end of the Anchor Strap and the Velcro Loop adjacent to the Velcro Hook.

Thread the distal end of the Anchor Strap through the adjustability section of an acetal plastic-based hook (Male) buckle.

Use a post sewing machine to permanently affix two folds approximately 1.5 inches apart on the distal end of the Anchor Strap to help prevent the hook (Male) buckle from accidentally sliding off the Anchor Strap.

Create the Loop Strap by cutting the polyester BETA 520 strap webbing into a 3.5-inch section. Loop one end of the cut section through the Plastic Square Loop AP036 and back onto itself. Then use a Bartack sewing machine to permanently affix the Plastic Square Loop AP036 to the Anchor Strap surface opposite of the distal end of the Velcro Loop.

Example 5: Attachment of Transfer Sheet to Stretcher or Bed

Begin by attaching the Stretcher Anchors to the stretcher frame at the recommended locations (FIGS. 5A, 6, and 7).

Use the tag on each of the stretcher anchors to determine the correct placement of the anchor (FIG. 3).

Wrap the distal end of the anchor around the stretcher frame and feed it through the plastic loop. Then, bring it back onto itself and secure the hook and loop materials together (FIG. 5).

Next, buckle the patient transfer sheet to stretcher anchors by laying the patient transfer sheet on the stretcher mattress with the receiver buckles on the top side.

The end of the patient transfer sheet indicated as the "head" end of the patient transfer sheet should be placed near the loading end of the stretcher, and the other end of patient transfer sheet indicated as the "foot" end should be towards the control end of the stretcher (FIG. 5).

Clip all buckles and tighten the Stretcher Anchors until the patient transfer sheet is pulled tight and even on the mattress.

Patient Transfer Sheet Deployment Step 1:

Buckle the patient transfer sheet to all stretcher anchors and tighten until tight.

Patient Transfer Sheet Deployment Step 2:

Lay a stretcher sheet (or hospital bed sheet) on top of the patient transfer sheet.

Patient Transfer Sheet Deployment Step 3:

Once the patient is laying upon the stretcher sheet (or hospital bed sheet) on the of the stretcher and the patient is ready to be transferred onto another surface, simply unclip the patient transfer sheet buckles along the outside edge of the stretcher (FIG. 5C) and follow your standard procedures and guidelines to perform a lateral patient transfer (FIG. 5D).

Example 6: Patient Transfer Sheet Cleaning

For the patient transfer sheet, hand wash with mild liquid cleaner according to manufacturer instructions. For machine washing, wash the patient transfer sheet in detergent and water up to 60 degrees Celsius on a gentle cycle, or wipe with disinfectant cleaner, e.g., Cavi Wipes, Opti-Cide MAX, PDIs Super Sani-Cloth. Do not bleach the patient transfer sheet. Hang or wipe to dry the patient transfer sheet.

For the patient transfer sheet stretcher anchors, hand wash or machine wash in detergent and water up to 60 degrees Celsius on a gentle cycle, or wipe with disinfectant cleaner, e.g., Cavi Wipes, Opti-Cide MAX, PDIs Super Sani-Cloth. A 5% non-chlorinated bleach solution may be used. Hang or wipe to dry.

The patient transfer sheet is in some embodiments washed approximately 1, 2, 3, 4, 5, 10, or even 15 or more times at high temperatures before needing to be replaced.

All of the references cited above, as well as all references cited herein, are incorporated herein by reference in their entireties for all purposes. The following examples are offered by way of illustration and not by way of limitation.

The breadth and scope of the present disclosure should not be limited by any of the above-described exemplary embodiments but should be defined only in accordance with the following claims and their equivalents. That is, the above examples are included to demonstrate various exemplary embodiments of the described methods and systems. It will be appreciated by those of skill in the art that the techniques disclosed in the examples represent techniques discovered by the inventor to function well in the practice of the described methods and systems, and thus are in some instances considered to constitute optional or exemplary modes for its practice. However, those of skill in the art will, in light of the present disclosure, appreciate that many changes can be made in these specific embodiments that are disclosed and still obtain a like or similar result without departing from the spirit and scope of the described methods and systems.

What is claimed is:

1. A bed-to-bed patient transfer sheet, comprising:

a) a tubular plastic sheet, comprising:

a short dimension and a long dimension perpendicular to each other lying in a single plane and describing a rectangular shape of the tubular plastic sheet, wherein the tubular plastic sheet is planar, and in a linear direction, has a head section, an upper and lower middle section, and a foot section, an outside surface of the tubular plastic sheet and an inside surface of the tubular plastic sheet, wherein the outside surface is located on an opposite side of the inside surface and together form a tube shape, a top open end and a bottom open end formed at opposite ends of the tubular plastic sheet, each having a diameter in the short dimension of the tubular plastic sheet and located perpendicular to the outside surface and inside surface, and a first edge and a second edge formed opposite each other in the long dimension, wherein the first edge and second edge are parallel to each other and each perpendicular to the short dimension, b) 6 to 8 first localized buckle attachment straps are positioned in the head section, upper and lower middle sections, and foot section, each attached to the tubular plastic sheet and comprising a sewn end and an attachment end, wherein first localized buckle attachment straps comprise a first localized buckle head-left and head-right attachment straps, an upper middle left and right attachment straps, a lower middle left and right attachment straps, and a foot-left and foot-right attachment straps, wherein the sewn end and the attachment end of each of the first localized buckle head attachment straps, upper and lower middle attachment straps, and foot attachment straps are located opposite each other, wherein each of the first localized head attachment straps, upper and lower middle attachment straps, and foot attachment straps is rectangular in shape and comprises a long dimension and a short dimension, and wherein the localized first buckle head-left and head-right first attachment straps, and localized first buckle foot-left and foot-right attachment straps are diagonally affixed on each of the first edge and the second edge, and the localized first buckle upper middle left and right attachment straps, and localized first buckle lower middle left and right attachment straps are horizontally affixed on each of the first edge and the second edge, and c) an attachment means comprising a quick-release fastener, clasp, buckle, zipper, or clip permanently attached to each of the attachment ends of the first attachment straps, wherein the tubular plastic sheet possesses dimensions of about 3 feet to about 6 feet in the long dimension and about 2 feet to about 4 feet in the short dimension and approximates a surface area of a bed, with the top end positioned at a head of the bed, and the bottom end positioned at a foot of the bed.

2. The transfer sheet of claim 1, further comprising a number of localized second buckle attachment straps comprising a second localized buckle head-left and head-right attachment straps, second upper middle left and right attachment straps, second lower middle left and right attachment straps, and a second foot-left and foot-right attachment straps, wherein the localized head-left and head-right second attachment straps, and localized foot-left and foot-right second attachment straps are diagonally attached second attachment straps that are equal in number to the localized first attachment buckle straps, wherein the localized upper middle left and right second attachment straps, and localized lower middle left and right second attachment straps are horizontally attached localized second attachment straps that are equal in number to the localized first attachment buckle straps, wherein each of the localized second attachment straps comprise a strap end and a cognate end, wherein each of the strap ends and each of the cognate ends are positioned opposite of each other on each localized second attachment straps, and wherein each of the cognate ends comprise affixed thereto a directionally matched attached counterpart localized attachment means that interacts with each of the localized first attachment means to affix each of the localized first attachment straps individually to an individual one of each of the localized second attachment straps via interlocking attachment means and cognate ends.

3. The transfer sheet of claim 2, wherein the localized second attachment straps are fixedly attached to one or more components of the bed and are located in positions on the bed such that when the transfer sheet is laid flat on the bed, each of the respective diagonal and horizontal localized first attachment means fixedly attach to the matching counterpart respective diagonal and horizontal localized second attachment means, thereby affixing the patient transfer sheet to the bed.

4. The transfer sheet of claim 1, wherein the bed is a human bed and/or wherein the bed is a stretcher, gurney, hospital bed, cot, or patient transport platform.

5. The transfer sheet of claim 2, wherein the bed comprises at least two rails or bars positioned parallel to a longer length of the bed, each of the at least two rails positioned opposite each other and positioned underneath or next to the bed, to which an equal number of the localized second attachment straps are fixedly attached, wherein the rails or bars are approximately circular in circumference thereby allowing at least the strap end of each of the localized second horizontal attachment straps to wrap around the rails or bars.

6. The transfer sheet of claim 5, wherein the bed further comprises one or more flat, waffled stretcher support structures that are fixedly attached to the at least two rails or bars, wherein at least one of the flat, waffled stretcher support structures is positioned in between the at least two rails and underneath or next to the bed, and wherein the at least one flat, waffled stretcher support structure provides an additional or alternative equal number of localized strap attachment locations for the first and/or second localized attachment straps in the horizontal plane.

7. The transfer sheet of claim 1, wherein the tubular plastic sheet is comprised of nylon, and wherein the nylon is selected from one or more of nylon 6, nylon 11, nylon 12, nylon 66, nylon 4 6, nylon 6 9, nylon 6 10, nylon 6 11, nylon 6 12, nylon 6/66 copolymer, and nylon 6/12/66 terpolymer.

8. The transfer sheet of claim 1, wherein:

(i) the tubular plastic sheet is comprised of a woven plastic, (ii) the tubular plastic sheet is a woven nylon ripstop sheet, (iii) the tubular plastic sheet is comprised of a nylon 70×70 denier woven ripstop sheet, (iv) the tubular plastic sheet is comprised of one or more of polyketone, polyester, glass-filled nylon, polyethylene, and polyvinylchoride, or (v) the tubular plastic sheet is comprised of fabric-backed plastic sheeting or reinforced plastic sheeting.

9. The transfer sheet of claim 1, wherein the outside surface and/or the inside surface comprises a coating.

10. The transfer sheet of claim 9, wherein the coating comprises polyurethane, wherein the inside surface is coated with an antistatic treatment comprising silicone, and/or wherein the outside surface comprises an impermeable, water-resistant, or water-proof coating which comprises polyurethane.

11. The transfer sheet of claim 1, wherein the first attachment straps comprise polyvinylchloride (PVC) coated fibers selected from one or more of polyester, natural fiber webbing, synthetic fiber webbing, ultra-high molecular weight polyethylene (UHMWPE) fiber laminated between sheets of polyester, and para-aramid.

12. The transfer sheet of claim 1, wherein the quick-release fastener is comprised of one or more of a male hook and a female receiver buckle, clasps, clips, hooks, and loops.

13. The transfer sheet of claim 1, wherein the quick-release fastener is comprised of one or more of plastic, metal, natural fibers, ultra-high molecular weight polyethylene (UHMWPE) fiber laminated between sheets of polyester, and para-aramid.

14. The transfer sheet of claim 1, wherein the tubular plastic sheet further comprises one or more barrier layers fixedly attached to an outer surface of the tubular plastic sheet and matching the dimensions of the tubular plastic sheet.

15. The transfer sheet of claim 14, wherein attachment of the one or more barrier layers is fixedly attached to the to the outer surface of the tubular plastic sheet by stitching, adhesives, or melt bonding.

16. The transfer sheet of claim 1, wherein the localized first attachment straps are fixedly attached to the first edge and the second edge of the tubular plastic sheet by stitching, adhesives, or melt bonding.

17. A method of transferring a patient laying on a first bed to a second bed, which comprises:

(a) providing the transfer sheet of claim 5, (b) attaching localized diagonal and horizontal second attachment straps to the first bed, (c) positioning the transfer sheet on top of the first bed with the top open end of the transfer sheet at a head of the first bed and the bottom open end at a foot of the first bed, aligning the localized first diagonal and horizontal attachment straps with the localized second diagonal and horizontal attachment straps such that the attachment means are in proximity of the cognate ends of the localized second attachment straps in the horizontal plane, (d) interlocking the cognate ends with the attachment means for each of the localized first attachment straps and localized second attachment straps, (e) positioning a cloth sheet on top of the transfer sheet, (f) positioning the patient onto the cloth sheet, (g) positioning the first bed such that the first bed is approximately parallel to the second bed, (h) releasing the cognate ends from the localized attachment means only on one side of the first bed, wherein the one side is opposite a second side of the first bed and opposite where the second bed is positioned, and (i) pulling the cloth sheet horizontally from the first bed to the second bed thereby moving the patient from the first bed to the second bed, wherein upon completion of the moving the transfer sheet remains attached via the straps on the second side of the first bed.

18. The method according to claim 17, wherein the transfer sheet is returned and reattached to the first bed.

19. A system for transferring a patient, comprising:

a) the patient transfer sheet according to claim 2, and b) a bed, wherein the bed is a stretcher, gurney, hospital bed, portable bed, cot, wheeled cot, army bed, folding bed, patient transport platform, or bed on wheels, wherein the transfer sheet is placed on top of the bed, and integrating the transfer sheet to the bed by horizontally attaching the localized second attachment straps to the bed and aligning with the localized first diagonal and horizontal attachment straps of the tubular plastic sheet such that they are connecting and securing the transfer sheet to the bed in the horizontal plane.

20. The transfer sheet of claim 1, wherein the bed is a human bed.

21. The transfer sheet of claim 2, wherein the localized first and second attachment straps are only in the horizontal plane.

22. The transfer sheet of claim 2, wherein the localized first and second attachment straps do not lie and are not attached in a vertical plane perpendicular to the horizontal plane, and wherein the transfer sheet does not comprise a harness system comprised of vertical attachment straps in the vertical plane.

23. The transfer sheet of claim 1, wherein, the number of first localized buckle attachment straps is 8.

* * * * *